Nov. 30, 1937.                    J. W. BARNA                    2,100,794
                             MANUFACTURE OF SHOES
                             Filed Sept. 11, 1936                2 Sheets-Sheet 1
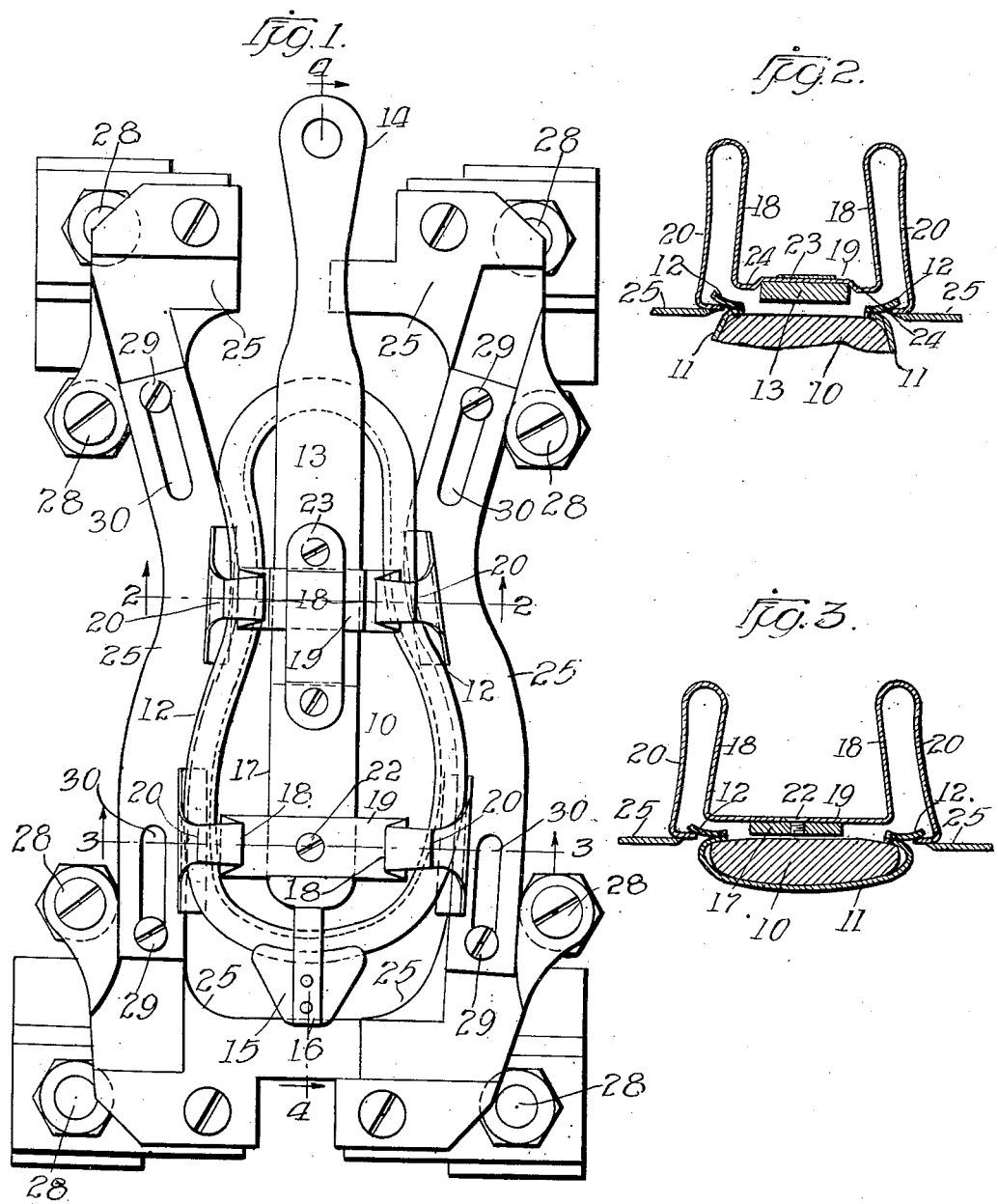
Witness:
Harry R. L. White
Inventor:
Joseph W. Barna
By J. W. Roberts
     Atty.

Nov. 30, 1937. J. W. BARNA 2,100,794
MANUFACTURE OF SHOES
Filed Sept. 11, 1936  2 Sheets-Sheet 2
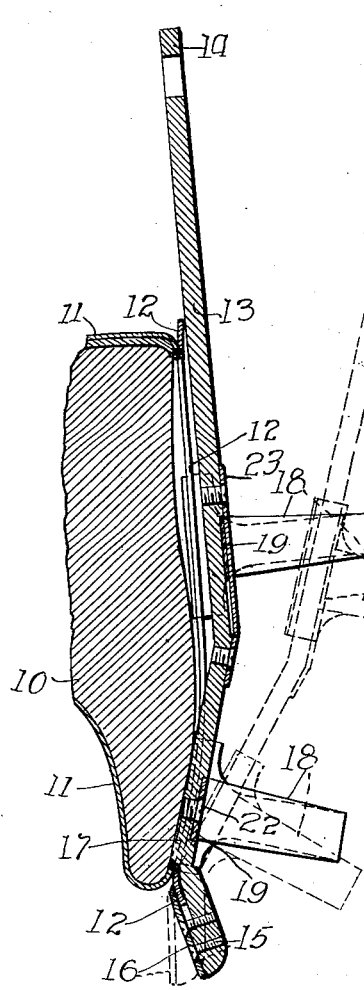
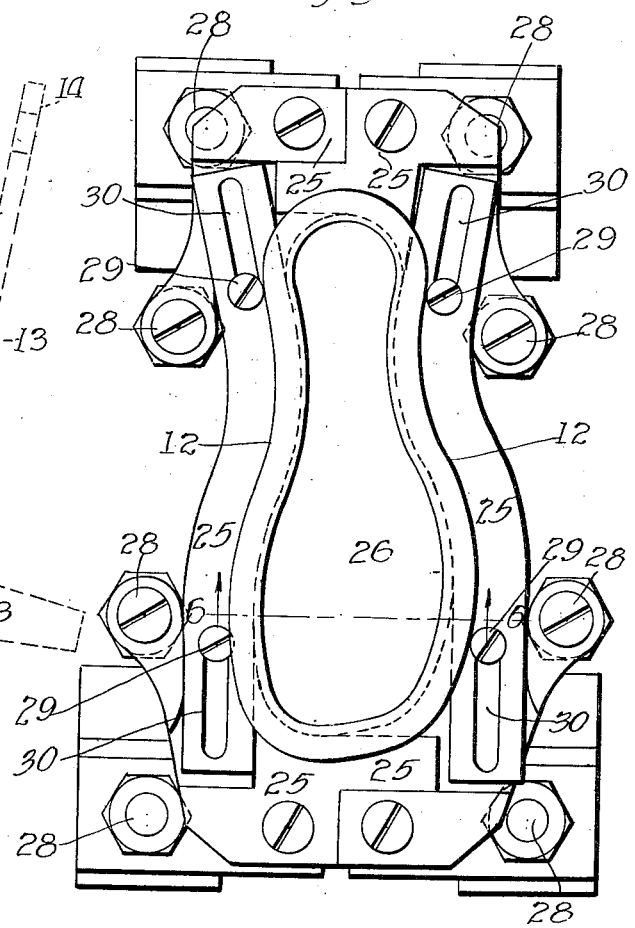
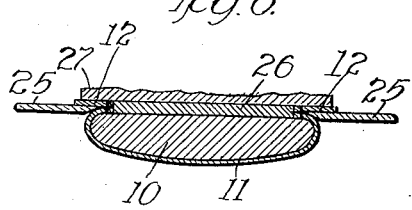

Patented Nov. 30, 1937

2,100,794

UNITED STATES PATENT OFFICE 2,100,794

MANUFACTURE OF SHOES

Joseph W. Barna, Chicago, Ill.

Application September 11, 1936, Serial No. 101,259

5 Claims. (Cl. 12—107)

The invention relates to the manufacture of shoes having pre-welt uppers, and one of its objects is to hold the upper and its stitched welt in its preliminary position around the sole of the last with the free edge of the welt raised or flared upwardly away from the upper so that it will permit the lasting wipers in their normal operation to pass freely under it without delay or obstruction and engage the work at the seam between the welt and upper to stretch the upper taut upon the body of the last and draw the welt and edge of the upper upon the sole of the last. Another object is to provide a holder constructed to sustain a pre-welt upper in its pre-lasting position around the sole of the last with the welt flared outwardly from the upper, and by which the last and its welted upper so assembled may be readily mounted as a unit in inverted position in a lasting machine with the welt supporting the work on the lasting-wipers in position for the lasting operation, and which may be withdrawn before the work is lasted without affecting the position of the upper on the last. Other objects will be apparent from the disclosure.

In the drawings Fig. 1 is a plan view of a welt-raiser in position on the work in its preliminary position, with lasting wipers shown in outline in their initial position under the welt; Figs. 2 and 3 are cross-sectional views of the welt-raiser on the lines 2—2 and 3—3, respectively, in Fig. 1; Fig. 4 is a longitudinal sectional view of the welt-raiser shown in dotted lines in position to engage the toe-portion of the welt and in full lines in position to raise it; Fig. 5 is a plan view showing the work in lasted position after the welt-raiser is removed and the insole is positioned on the last; and Fig. 6 is a detail sectional view on the line 6—6 in Fig. 5 with the outer sole in place.

In the drawings, the reference numeral 10 indicates a last, 11 a shoe-upper, preferably with a counter and box toe, and 12 the welt which is stitched to the upper, as usual; as the welt then lies flat against the forepart and shank of the upper it must be turned or bent outwardly to allow the lasting-wipers to pass under it. The body of the welt-raiser is a narrow metal strip 13, somewhat longer than the last to provide a handle 14 at one end, and at its opposite end it is provided with an outward and upward projection 15, which carries a rearwardly extending lower lip 16 to form a hook-connection with the toe-portion of the upper as shown in Figs. 1 and 4. The strip is bowed or bent downward as at 17 near its toe-end to provide a fulcrum to raise the front hook-end when the handle is depressed, as shown in Figs. 1 and 4. The strip carries at the sides of its toe-portion a pair of opposite members constructed to take under and raise the sides of the toe-portion of the welt, and at the sides of its shank portion a pair of similar members to take under and raise the shank portion of the welt. In the form shown each member is in the form of a resilient metal strip consisting of opposite upwardly extending arms 18, connected at their lower ends by a cross-piece 19, and rebent at their upper ends to provide outer spring arms 20, of a length to terminate at their lower ends in inwardly extending elongated lips 21 to take under the outer face of the welt and raise it up. The cross-piece 19 of the front pair of raisers is fastened as at 22 to the strip 13, and the cross-piece 19 of the rear pair of raisers is movably connected to the body 13 to adjust them along its length for different sizes of lasts, as by providing a longitudinal keeper-strip 23 overlying the cross-piece and fastened at its ends to the body; the rear cross-piece has transverse ribs 24 to embrace and slide along the sides of the body to preserve the alignment of the lips with the work.

In using the welt-raiser the inverted last is inserted loosely in the upper and the lip 16 of the welt-raiser is positioned under the toe of the welt as shown in dotted lines in Fig. 4 and raised up to the position shown in full lines therein by tilting the handle down upon the sole of the last as shown in full lines in Fig. 4, thus raising the toe-portion of the welt to upwardly flared position and drawing it up onto the toe of the last. The lips 21 of the side-raisers are then placed in position under the outer face of the welt by swinging them outwardly, manually pushing the welt into position approximately into line with the edge of the sole of the last, and inserting the lips under the welt to raise it as shown in Figs. 2 and 3. The upper and welt are thus clamped in preliminary position on the edge of the last with the welt raised or flared upwardly, and this assemblage is then suspended in a suitable lasting machine with the welt in position to overlie the wipers 25, which are moved inwardly to sustaining position under the welt and raisers as shown in Figs. 1, 2, and 3. The welt-raiser is then removed, a cork filler or insole 26 is laid on the last, and the wipers are moved to lasting position to stretch the upper upon the body of the last and lay its edge and the welt on the last up to the filler or insole as shown in Fig. 5. The wipers form a bed to support the work in lasted position while the insole and welt are wiped with cement and the outer sole 27 is cemented on the insole and welt under suitable pressure to ensure permanent adhesion. No tacks are required at any stage of the proceedings, and the upper can be accurately positioned on the last when pulled loosely on it to locate the line of its toe-cap straight across the toe of the last and center its back-seam upon the heel of the last at both its top and bottom. The welt-raiser not only facilitates these preliminary operations, but it also holds the assembled upper and welt in position on the last until the lasting-wipers engage the work, and then it can be removed without displacing any part of the work on the last or affecting the engagement of the wipers with the work. The form of the clamps may be varied and the number employed may be changed according to the requirements of different lasts; those shown being adapted for children's shoes; they preferably are formed with elongated surfaces to engage extended portions of the welt. Ordinarily no clamps are necessary at the heel portion of the work as the welt there is usually wetted and turned up and held by the counter.

The wipers may be of any suitable type but preferably are constructed to engage the upper all around the last and to expand and contract in the contour of the style of the last selected. As shown they are of the type disclosed in my copending application for patent filed September 6, 1935, Serial Number 39,393, comprising sectional heel-wipers and sectional toe-wipers having slip-joints, and side-wipers for the shank and ball portions of the welt supported on the heel and toe wipers and having slip joints therewith. Each section of the heel and toe wipers is carried on a pair of posts 28, and the side wipers are connected to their supporting wipers by sliding connections such as the pin 29 and slot 30. In the lasting operation the sections of the toe-wipers and the sections of the heel-wipers are moved transversely of the line of the last into and away from their lasting positions, the side-wipers being correspondingly moved by their supporting parts, and the toe and heel wiper units are moved longitudinally of the line of the last, as shown in Figs. 1 and 5.

I claim:

1. A device to clamp a pre-welt upper on a last consisting of a bar having a fulcrum near its toe-end and a welt-engaging member at its toe-end constructed and arranged to turn the welt away from the upper and clamp the work onto the toe of the last when the bar swings on its fulcrum toward the sole of the last, and clamps on the sides of the bar constructed and arranged to hold the free edge of the welt away from the upper and to sustain the work upon the edge of the sole of the last when the bar swings to position thereon.

2. A device to clamp a pre-welt upper on a last consisting of a rectangular bar having an upward projection at one end provided with an underlying and inwardly opening hook, an opposite pair of welt-raisers on the bar for the sides of the toe-portion of the welt, and an opposite pair of welt-raisers on the bar for the shank portion of the welt, each such raiser comprising an upwardly extending member and a resilient member carried by the first member and extending downward to the plane of the bar, and an inwardly extending lip at the free end of said second member.

3. A device to clamp a pre-welt upper on a last consisting of a rectangular bar having an upward projection at one end provided with an underlying and inwardly opening hook, an opposite pair of welt-raisers on the bar for the sides of the toe-portion of the welt, and an opposite pair of welt-raisers on the bar for the shank portion of the welt, each such raiser comprising an upwardly extending member and a resilient member carried by the first member and extending downward to the plane of the bar, an inwardly extending lip at the free end of said second member, and means to adjust the raisers for the shank portion of the welt along the bar.

4. A device to clamp a pre-welt upper on a last consisting of a bar having a fulcrum near one end and a hook beyond the fulcrum constructed and arranged to engage and turn the welt away from the toe of the upper when the bar is swung toward the last, and spring members on the sides of the bar constructed and arranged to hold the free edge of the welt away from the forepart and shank of the upper and clamp the work upon the edge of the sole of the last when the bar is swung to position thereon.

5. A device to clamp a pre-welt upper on a last consisting of a bar having an angular end provided with an inwardly opening hook, an opposite pair of welt-raisers on the bar for the sides of the forepart of the welt, and an opposite pair of welt-raisers on the bar for the shank portion of the welt, each such raiser comprising a flexible member and an elongated inwardly extending lip.

JOSEPH W. BARNA.